Patented June 1, 1926.

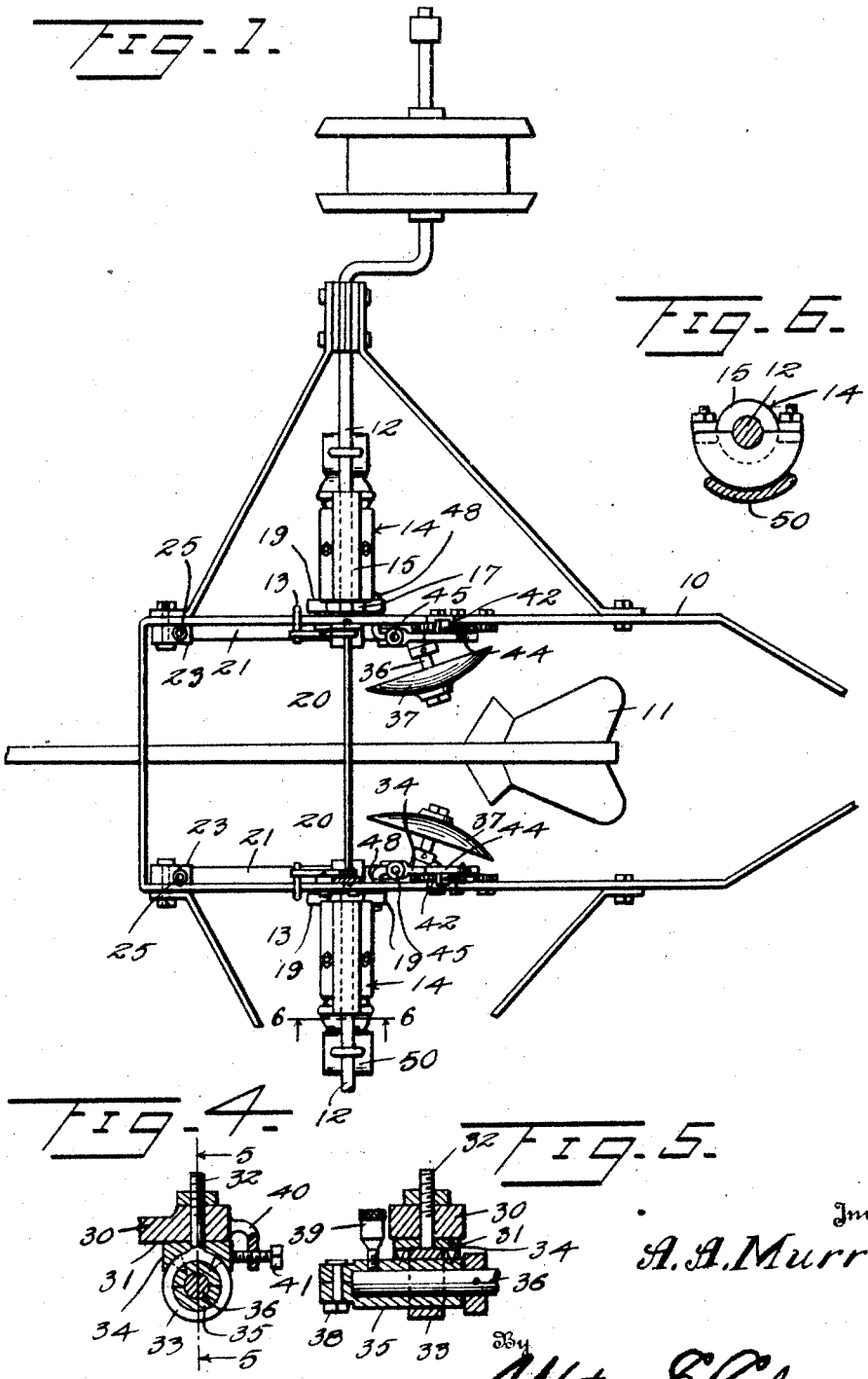

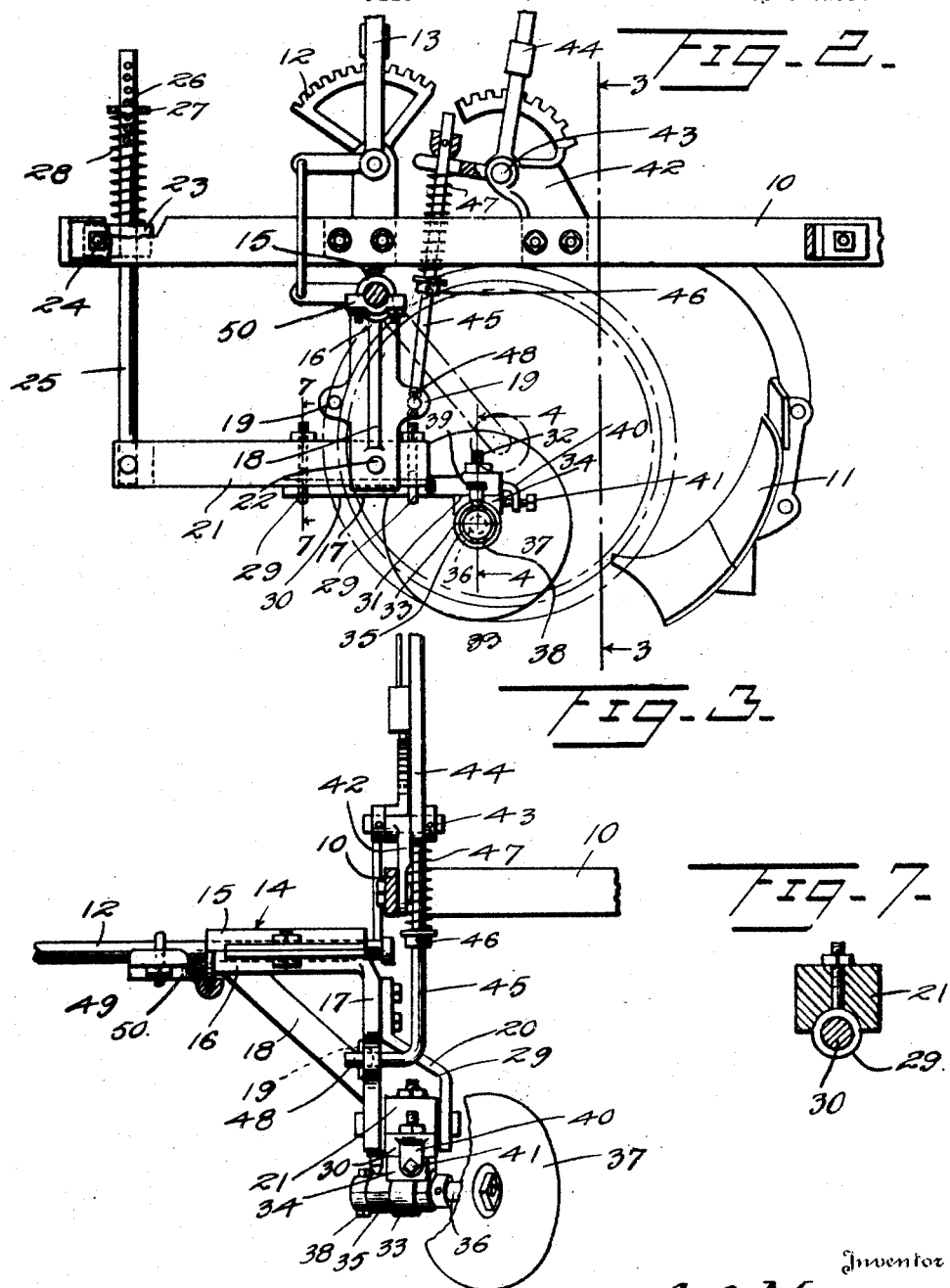

1,586,692

UNITED STATES PATENT OFFICE.

ASA ALFRED MURREN, OF DELIA, KANSAS.

WEEDER ATTACHMENT FOR LISTER PLOWS.

Application filed January 19, 1926. Serial No. 82,317.

This invention relates to weeder attachments for lister plows and similar devices and has for a particular object thereof the provision of a novel and improved mounting for an earth working implement whereby a maximum range of adjustment of the implement may be had.

A further object of the invention is to provide the combination with agricultural implements including crank axle lifts for determining the depth of the engagement of the ground engaging implements with the ground means for supporting from such crank shafts a further work engaging implement, the connections with the last named work engaging implement being such as to permit hoisting of the work engaging implement as the frame is elevated.

A further object of the invention is to provide a device of this character which may be cheaply and readily produced and which is very readily attached to the implement.

These and other objects I attain by the construction shown in the accompanying drawings, wherein for the purpose of illustration is shown a preferred embodiment of my invention and wherein:—

Figure 1 is a fragmentary plan view of a lister plow having weeder attachments constructed in accordance with my invention;

Figure 2 is an enlarged sectional view showing the weeder attachment in side elevation;

Figure 3 is a rear elevation of the weeder mechanism taken on the section line designated at 3—3 on Figure 2;

Figure 4 is an enlarged detail sectional view taken on the line 4—4 of Figure 2;

Figure 5 is a section on the line 5—5 of Figure 4;

Figure 6 is a section on the line 6—6 of Figure 1;

Figure 7 is a section on the line 7—7 of Figure 2.

Referring now more particularly to the drawings, the numeral 10 generally designates parallel side members of a lister plow frame, the plow being indicated at 11. This frame has associated therewith crank shafts 12 rotatable through the usual control handles 13 to determine the height of the frame 10 above the ground and accordingly the depth of engagement of the plow 11 with the ground.

In accordance with my invention, I provide bearings 14 rotatably engaging the inner ends of the crank shafts 12, these bearings being formed in upper and lower sections 15 and 16 bolted or otherwise secured to one another about the shaft. The lower section 16 has depending therefrom at its inner end a vertical supporting element 17 suitably braced to the outer end of the bearing element, as at 18. This vertical support is formed adjacent its lower end at both its front and rear faces with eyes 19, the purpose of which will hereinafter appear.

Bolted or otherwise secured to the support 17 is a supplementary support 20 so constructed that its lower end opposes the lower end of the support 17 in spaced relation thereto and provides therewith a slot directed longitudinally of the frame beam 10 with which it approximately aligns. Through this slot is directed an arm 21 pinned to the members 17 and 18, as indicated at 22.

Adjacent the forward end of each beam 10 in alignment with the forward end of the arm 21 a block 23 is pivoted to the frame beam, as at 24. This block has a vertically directed opening through which is slidably directed a support 25 having at its upper end an adjustable pin 26 against which abuts a spring seat 27 for the upper end of a spring 28. The lower end of this spring engages against the block and constitutes a means for normally maintaining the arm 21 at a predetermined elevation while at the same time permitting this arm to give under sudden stress as, for example, when the rear end of the arm is suddenly forced rearwardly or upwardly. Adjustably secured to the under surface of the arm 21, as by means of eye bolts 29 is an extension arm 30, the rear end of which is formed with a flat under surface 31 having a centrally arranged pivot bolt 32. Abutting the flat under surface 31 of the extension arm 30 and held thereagainst by means of an eye bolt 33 is a casting 34 providing a seat for the upper section of a work boxing 35 receiving the shaft 36 of a cultivator disk 37. The boxing is in two sections bolted together, as at 38, and preferably is supplied with a grease cup 39 for lubricating the shaft. While the pivot bolt, when tightened, affords a means for preventing rotation of the boxing about the bolt as an axis, I preferably provide a further means for preventing such rotation such as a lug 40 upon the extension arm 30 opposing the periphery of the casting 34 and having a set-screw 41 for engaging thereagainst.

To the frame members 10 are secured pivot supports 42 in which are pivots 43 for bell crank adjusting levers 44, each of which engages the upper end of a rod 45 in a manner permitting elevation of the rod without movement of the lever. Each rod has secured thereto a stop collar 46 between which the stop and arm of the lever engaging the arm a depression spring 47 is disposed. The lower ends of the rods are each provided with a hook 48 engaging in the rear eye 19 of the associated vertical supports 17. In order to prevent longitudinal movement of the bearing elements 14 upon the shafts 12, I bolt or otherwise secure to these shafts, as at 49, a member having a hooked collar 50 engaging over a flange formed upon the inner end of the lower section 16 of the bearing. It will be noted that the supports 17 may rotate about the shafts 12 as axes and this rotation may be caused either by actuation of the lever 44 or by engagement of the disk 36 with an obstruction, such as a stone. The disk, when engaged by a stone, or when lifted by the lever, moves upwardly and rearwardly and this action is resisted by the spring 28 since it necessitates movement of the rod through the bearing 23 in a downward direction. It will also be noted that while the disk may have movement independently of the frame 10, whenever the frame is vertically adjusted, the disk moves with the frame so that as the plow is withdrawn from the ground, the disks will likewise be withdrawn. It will, of course, be obvious that while two of the supports and their associated mechanism have been illustrated, a single support may be employed where this is found desirable. It will be noted that in event a single support is employed, this support is made reversible by supplying the eyes 19 at opposite sides of the members 17.

Since the construction hereinbefore set forth is obviously capable of a certain range of change and modification without materially departing from the spirit of the invention, I do not limit myself to such specific structure except as hereinafter claimed.

I claim:—

1. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a ground working implement carried by the rear end of the arm, an operating lever carried by the frame and a connection between the operating lever and the depending portion of the bearing for rotating the bearing about the axle in one direction.

2. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a ground working implement carried by the rear end of the arm, an operating lever carried by the frame and a connection between the operating lever and the depending portion of the bearing for rotating the bearing about the axle in one direction and permitting independent rotating movement of the bearing about the axle in said direction.

3. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a ground working implement carried by the rear end of the arm, an operating lever carried by the frame, a connection between the operating lever and the depending portion of the bearing for rotating the bearing about the axle in one direction and permitting independent rotating movement of the bearing about the axle in said direction and a spring operating to resist such independent movement of the bearing without resisting movement of the bearing under the influence of the lever.

4. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a ground working implement carried by the rear end of the arm, an operating lever carried by the frame, a connection between the operating lever and the depending portion of the bearing for rotating the bearing about the axle in one direction, said bearing being shiftable longitudinally upon the axle and means for securing the bearing in adjusted positions.

5. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a ground working implement carried by the rear end of the arm, a bell crank lever pivoted upon the frame and having the short arm thereof forked, a link pivoted at its lower end to the depending support adjacent the lower end thereof and directed through said fork and a fixed stop upon the link above said fork.

6. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a ground working implement carried by the rear end of the arm, a bell crank lever pivoted upon the frame and having the short arm thereof forked, a link pivoted at its lower end to the depending support adjacent the lower end thereof and directed through said fork, a fixed stop upon the link above said fork, a stop upon the link beneath the fork and a spring surrounding the link between the fork and said stop.

7. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm comprising a link pivoted at its lower end to said arm, a block pivoted to the frame to swing in a plane directed longitudinally of the frame and having an opening through which said link passes, a spring seat carried by the upper end of the link and adjustable thereon, a spring disposed between said seat and block, an operating lever carried by the frame and a connection between the operating lever and the depending portion of the bearing for rotating the bearing about the axle in one direction.

8. In a weeder attachment for agricultural implements and the combination with an implement having a frame and a crank axle rotatably engaging the frame and upon the crank of which the supporting wheel is mounted, of a bearing rotatably engaging the axle and having a depending support, an arm secured adjacent its rear end to the support, a supporting connection between the forward end of the arm and the frame permitting downward and rearward movement of the forward end of the arm, a bearing carried by the rear end of the arm and rotatably adjustable upon the rear end of the arm in a horizontal plane, a shaft mounted in the bearing, a disk carried by the shaft, an operating lever carried by the frame and a connection between the operating lever and the depending portion of the bearing for rotating the bearing about the axle in one direction.

In testimony whereof I hereunto affix my signature.

ASA ALFRED MURREN.